(12) United States Patent
Kim (10) Patent No.: US 8,839,900 B2
(45) Date of Patent: Sep. 23, 2014

(54) STRUCTURE OF ROLL-ROD FOR SUBFRAME

(75) Inventor: Seung-Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 211 days.

(21) Appl. No.: 13/551,339

(22) Filed: Jul. 17, 2012

(65) Prior Publication Data

US 2013/0043370 A1 Feb. 21, 2013

(30) Foreign Application Priority Data

Aug. 19, 2011 (KR) ........................ 10-2011-0082661

(51) Int. Cl.
 *B60K 5/12* (2006.01)
 *B62D 21/00* (2006.01)
 *B60K 5/00* (2006.01)
(52) U.S. Cl.
 CPC ........................................ *B60K 5/00* (2013.01)
 USPC ....... 180/312; 267/294; 267/140.11; 188/379
(58) Field of Classification Search
 USPC ............ 280/124.109; 180/312; 267/293, 294, 267/64.11, 64.13, 140.11, 140, 140.13, 267/141.1, 141.4; 188/379, 380; 248/638
 See application file for complete search history.

(56) References Cited

U.S. PATENT DOCUMENTS

| 5,088,704 | A  | * | 2/1992  | Kanda ........................... | 267/220 |
| 5,193,788 | A  | * | 3/1993  | Richter et al. ................ | 267/227 |
| 6,321,890 | B1 | * | 11/2001 | Suzuki et al. ................. | 188/379 |
| 8,500,109 | B2 | * | 8/2013  | Takeshima et al. ........... | 267/293 |

FOREIGN PATENT DOCUMENTS

| JP | 08-177945 A    | 7/1996 |
| JP | 2010-196841 A  | 9/2010 |
| KR | 1020110045998 A | 5/2011 |
| KR | 1020110053567 A | 5/2011 |

\* cited by examiner

*Primary Examiner* — Drew Brown
(74) *Attorney, Agent, or Firm* — Morgan, Lewis & Bockius LLP (57) ABSTRACT

A structure of a roll-rod for a subframe filled with a hydro liquid therein, may include a bracket bar, an inner pipe including a cylindrical pipe and a supporting plate joined with the cylindrical pipe, an endplate joined to the cylindrical pipe, an outer pipe enclosing the inner pipe between the bracket bar and the endplate and including an extension part, where the supporting plate may be disposed with a gap in the extension part having a curved shape, an insulator forming a front liquid chamber and a rear liquid chamber with the supporting plate to receive the hydro-liquid therein, and a housing, wherein the supporting plate may move relative to the outer pipe such that the gap varies while the insulator is elastically transformed according to movement of the bracket bar and the endplate.

7 Claims, 7 Drawing Sheets

B-B CROSS SECTION

REAR LIQUID CHAMBER   FRONT LIQUID CHAMBER

STRUCTURE OF ROLL-ROD FOR SUBFRAME

CROSS-REFERENCE TO RELATED APPLICATIONS

The present application claims priority to Korean Patent Application No. 10-2011-0082661, filed on Aug. 19, 2011, the entire contents of which is incorporated herein for all purposes by this reference.

BACKGROUND OF THE INVENTION

1. Field of the Invention

The present invention relates to a structure of a roll-rod for a subframe, and more particularly, to a structure of a roll-rod for a subframe that can more efficiently absorb and damp impact by variably controlling a flow state of a hydro liquid depending on an applied load while alleviating vibration and supporting behavior of a power train by using flow of the hydro liquid filled therein.

2. Description of Related Art

A monocoque body having a small weight and high productivity is primarily used in vehicles, instead of a frame body. In the monocoque body as a structure in which an additional frame is deleted, a power train in which an engine and a transmission are joined to each other is mounted directly on an engine room of a vehicle body. Therefore, in the monocoque body, the vehicle body itself serves as a frame, such that a suspension and chassis parts are respectively mounted thereon, however, a subframe is mounted under a vehicle in order to prevent vibration of the power train from being transferred directly to the vehicle body and to disperse impact when the vehicle collides.

Meanwhile, a supporting method of the power train can be largely divided into an inertia supporting method, a center supporting method, and a hybrid supporting method and among them, the subframe is mounted in the inertia supporting method. As the inertia supporting method, 4-point inertia supporting and 3-point inertia supporting are widely adopted. Therebetween, while as the subframe used in the inertia supporting method, an "I"-shaped subframe so called a dog bone type is used, and a suspension device and a steering device are joined to the subframe and connected to the bottom of the power train through a roll-rod.

Figure 1A:
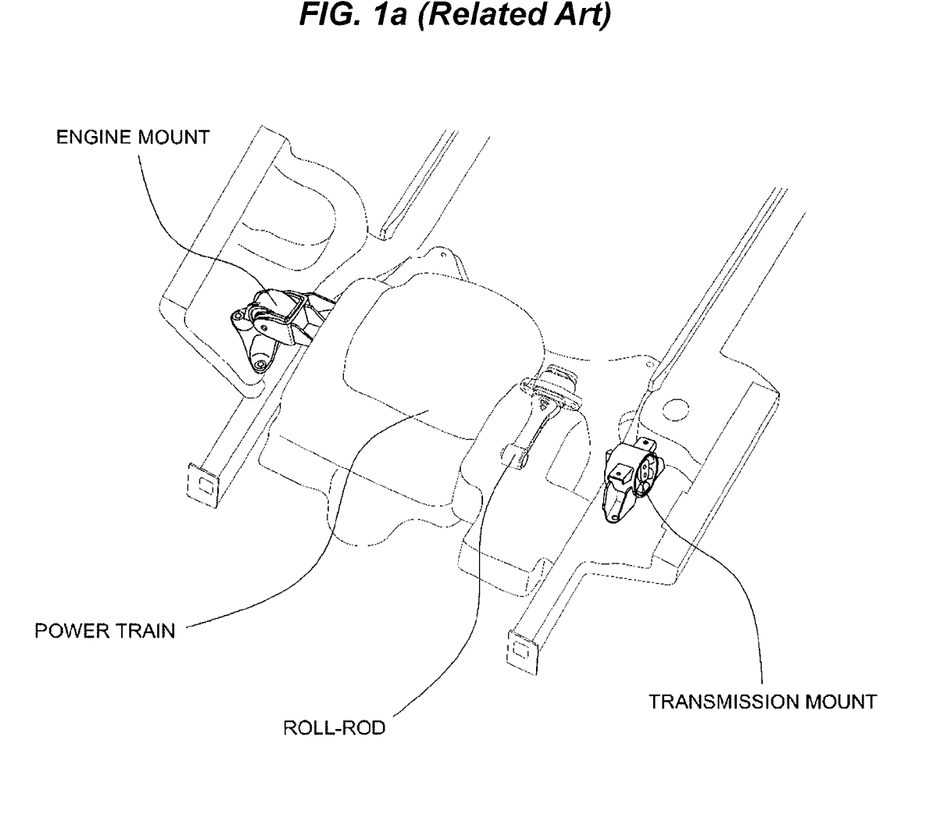
FIG. 1A is a diagram showing a state in which a roll-rod is mounted under a power train.

That is, as shown in FIG. 1A, while an engine mount and a transmission mount are mounted at both sides of the vehicle body, respectively to support a load of the power train, the roll-rod is mounted on a subframe (not shown) to share displacement control and vibration alleviation of the power train.

Figure 1B:
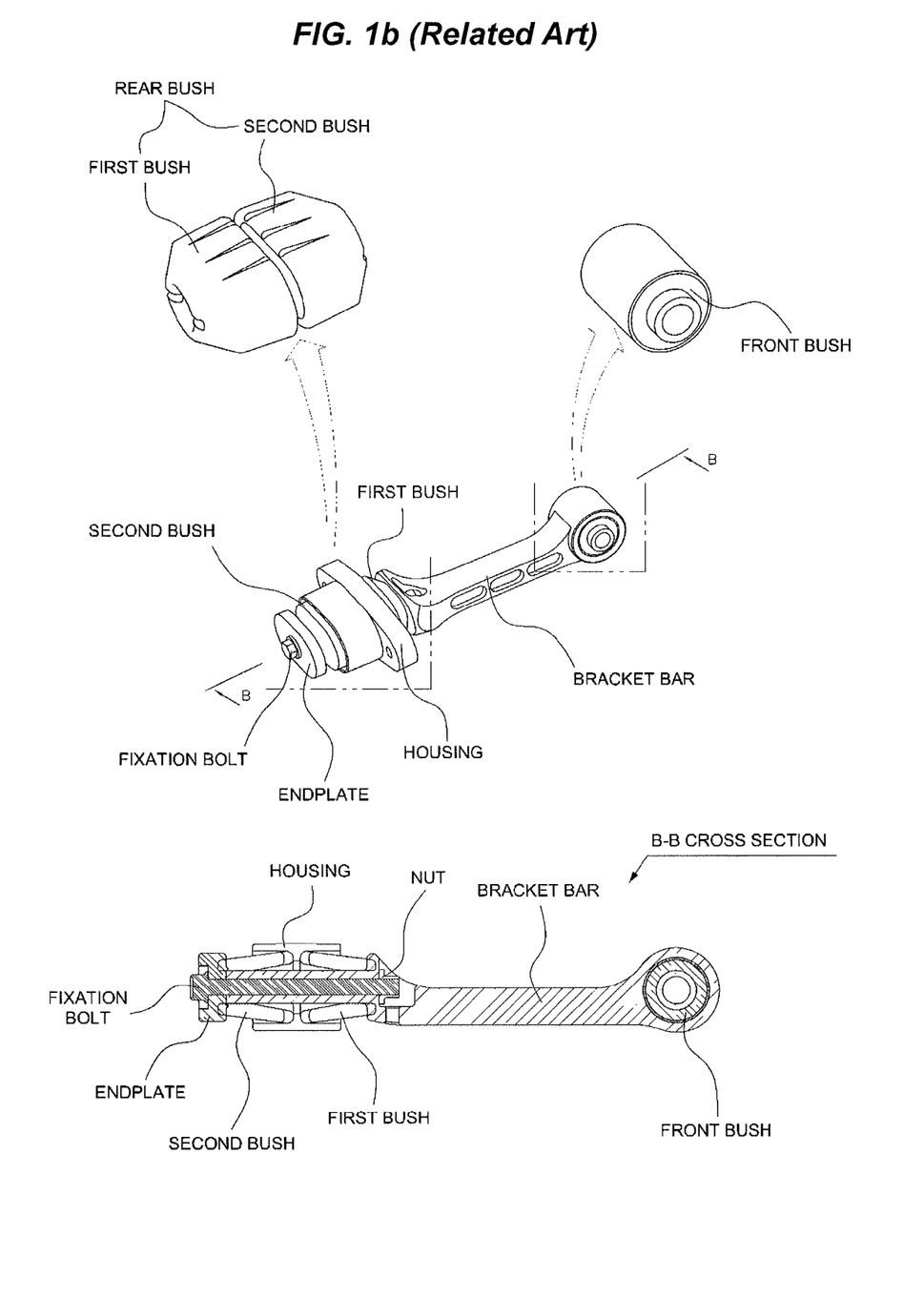
FIG. 1B is a perspective view and a cross-sectional view taken along line A-A showing a roll-rod having a structure in the related art.

A detailed structure of the roll-rod in the related art is shown in FIG. 1B. Referring to FIG. 1B, the roll-rod includes: a bracket bar having a cylindrical front bush mounted on one end thereof, which is connected to the bottom of a power train; an endplate joined to the other end of the bracket bar with a fixation bolt and a fixation nut; a housing joined to slide on the bracket bar and fixed to a subframe; and a rear bush including a first bush disposed at a front side of the housing and a second bush disposed at a rear side of the housing (based on a vehicle).

The first bush and the second bush are made of rubber and isolatedly disposed by a wall surface formed inside the housing. Therefore, while the housing is mounted and fixed on the subframe, the first bush or the second bush behaves to be elastically transformed and restored as the bracket bar and the endplate move.

That is, when the vehicle moves forward, the second bush is compressed by displacement of the power train by inertia to perform a damping function and when the vehicle moves backward or decelerates, the first bush is compressed to perform the damping function.

As described above, the roll-rod that performs load supporting and vibration alleviating functions of the power train occupies a large part in noise, vibration, and harshness (NVH) performance in particular, according to a shape and a characteristic of a rear bush.

However, the rear bush in the related art using elastic force of a material has a problem in that dynamic ratio (an increase ratio of dynamic load to static load) is large and tuning is difficult (in order to meet design requirements).

Further, the elastic transformation and restoration of the rear bush cause a fatigue of a material and durability deteriorates in continuous use as a structure without an additional stopper (supporting to prevent elastic compression of a predetermined reference or more).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of a roll-rod for a subframe in which dynamic ratio is low and an alleviation characteristic varies depending on a change in engine RPM.

In an aspect of the present invention, a structure of a roll-rod for a subframe filled with a hydro liquid therein, may include a bracket bar having a front bush mounted at one end thereof, an inner pipe including a cylindrical pipe, one end of which is mounted on the other end of the bracket bar, and a supporting plate joined with the cylindrical pipe, an endplate joined to the other end of the cylindrical pipe, wherein the endplate is spaced with from the cylindrical pipe, an outer pipe enclosing the inner pipe between the bracket bar and the endplate and including an extension part, where the supporting plate is disposed with a gap in the extension part having a curved shape such that an inner diameter of the extension part is shaped to be larger than an outer diameter of supporting plate while the inner pipe is inserted in the extension part, an insulator forming a front liquid chamber and a rear liquid chamber with the supporting plate in a front and a rear of the supporting plate in a longitudinal direction of the cylindrical pipe while the insulator is mounted between the cylindrical pipe and the outer pipe in a radial direction of the cylindrical pipe so as to receive the hydro-liquid therein, and a housing into which the outer pipe is inserted and fixedly joined and configured to be fixed to the subframe, wherein the supporting plate is movable relatively to the outer pipe such that the gap between the supporting plate and the extension part varies while the insulator is elastically transformed according to movement of the bracket bar and the endplate.

At least a lateral surface of the front liquid chamber and the rear liquid chamber is inclined from a radial axis of the cylindrical pipe.

The structure of the roll-rod for the subframe may further include a fixation bolt that joins the endplate to the bracket bar by penetrating the inner pipe.

The insulator may include a center portion joined with the supporting plate, a front portion spaced apart from the center portion to shield a side of the front liquid chamber, and a rear portion spaced apart from the center portion to shield a side of the rear liquid chamber, while the insulator is integrally molded with the inner pipe.

The structure of the roll-rod for the subframe may further include a fixation bolt that joins the endplate to the bracket bar by penetrating the inner pipe.

A front stopper is mounted at an end of the outer pipe and faces the bracket bar to prevent an impact between the housing and the bracket bar.

A rear stopper is mounted on the endplate and faces the housing to prevent an impact between the housing and the endplate.

According to an exemplary embodiment of the present invention, dynamic ratio is reduced by controlling damping force depending on behavior of a vehicle, thereby improving NVH performance of the vehicle.

That is, in a structure of the present invention using a principle of a venture pipe, as a volume of a passage between a front liquid chamber and a rear liquid chamber varies, vibration transfer is minimized and impact is more efficiently dampened.

When an engine is idle, a hydro liquid easily flows (while a gap between a supporting plate and an extension part is relatively large), and as a result, vibration is more efficiently alleviated, and since the hydro liquid becomes difficult to flow (while the gap between the supporting plate and the extension part gradually decreases) in a quick start, larger impact can be absorbed. Further, the flow of the hydro liquid is controlled according to a traveling state and an acceleration of the vehicle even while travelling, such that traveling performance is further improved.

In addition, a front stopper and a rear stopper are mounted to prevent an insulator from being excessively elastically transformed, thereby improving durability.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a roll-rod for a subframe according to an exemplary embodiment of the present invention will be described in more detail with reference to the accompanying drawings.

Figure 2:
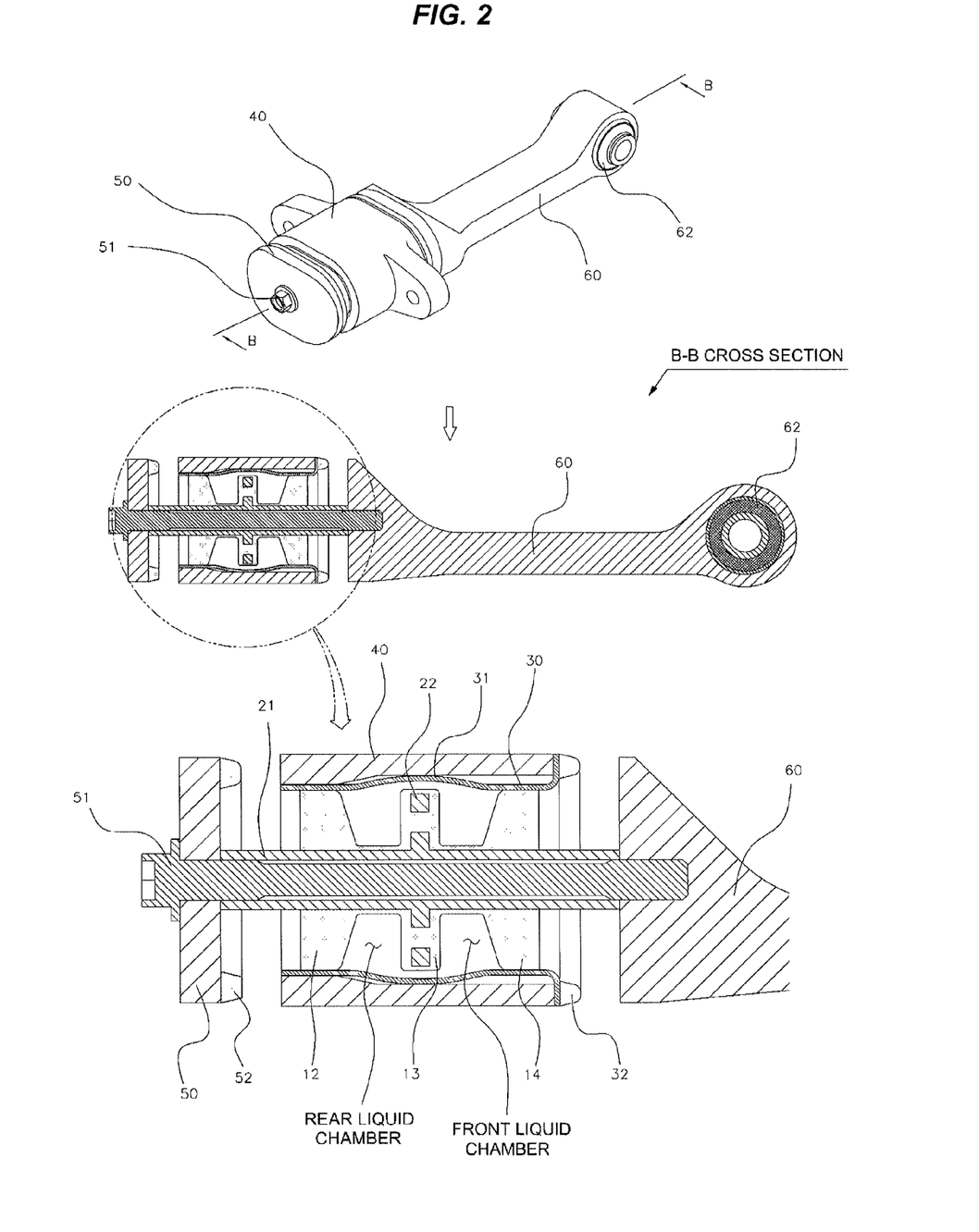
FIG. 2 is perspective view, a cross-sectional view taken along line B-B, and a partial enlarged diagram of a roll-rod according to an exemplary embodiment of the present invention.
Figure 3:
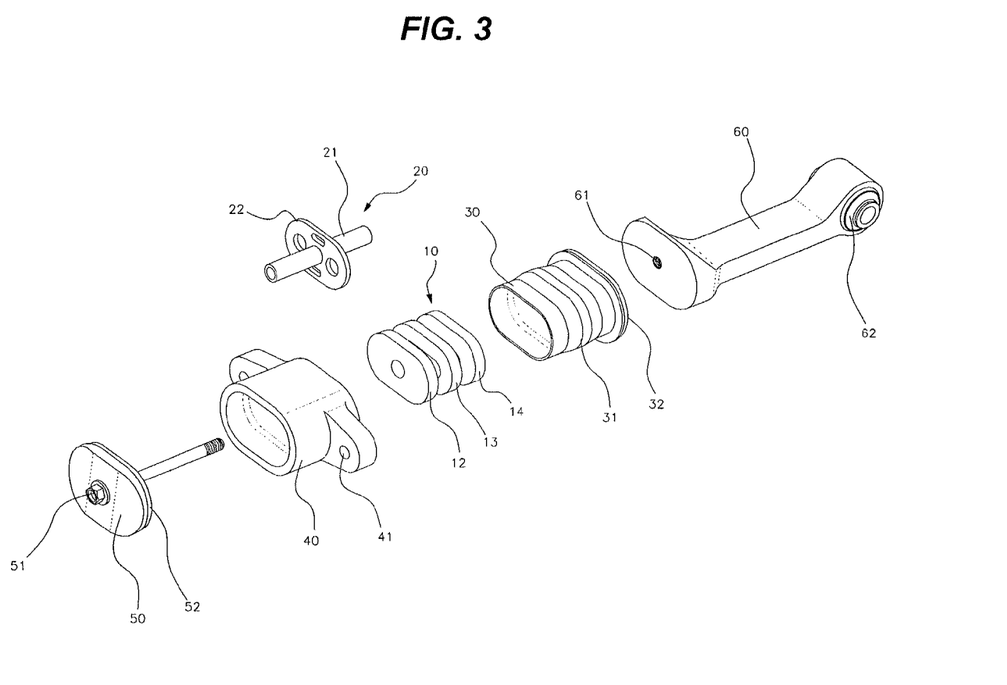
FIG. 3 is an exploded perspective view of the roll-rod according to the exemplary embodiment of the present invention.
Figure 4:
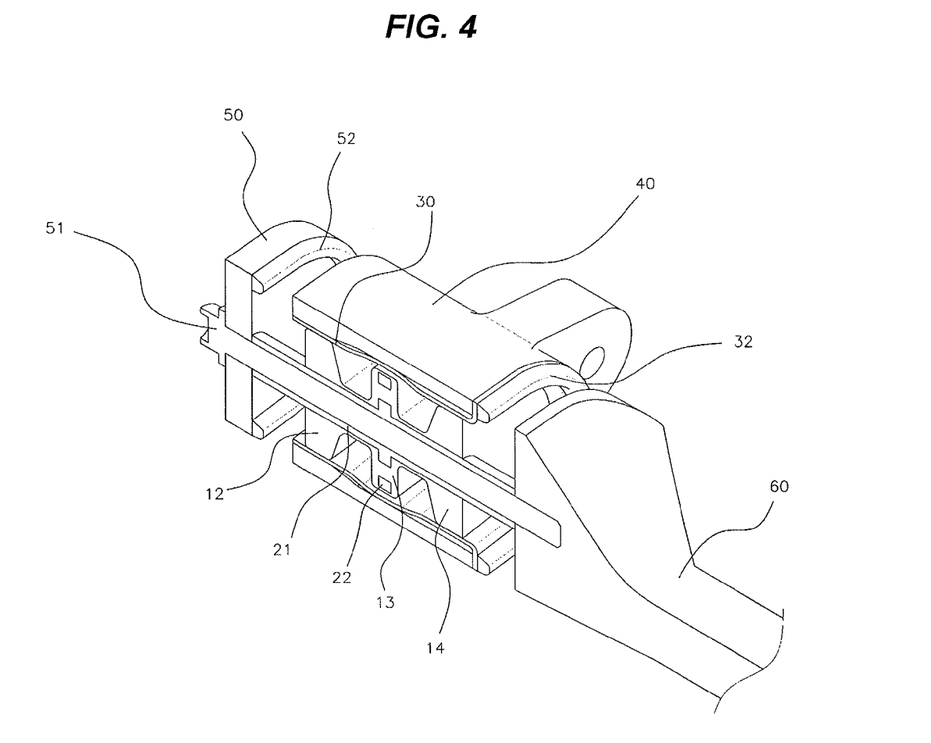
FIG. 4 is a longitudinal cross-sectional view of the roll-rod according to the exemplary embodiment of the present invention.

Referring to FIGS. 2 to 4, a cylindrical front bush 62 is mounted at one end of a bracket bar 60 according to the exemplary embodiment of the present invention to be joined to the bottom of a power train and a bolt hole 61 is formed at the other side to be fastened with a fixation bolt 51.

An inner pipe 20 and an end stopper 50 are mounted at the other side of the bracket bar 60 through the fixation bolt 51. While the inner pipe 20 has a cylindrical pipe 21 opened in a longitudinal direction, the inner pipe 20 is formed to be perpendicular to a longitudinal direction of the supporting plate 22 having a predetermined size at a middle position of the pipe 21. The inner pipe 20 is integrally formed with an insulator 10 (through insert injection or rubber vulcanization molding) when the insulator 10 is manufactured. The inner pipe 20 and the insulator 10 is mounted in an outer pipe 30 to form a front liquid chamber and a rear liquid chamber filled with a predetermined amount of hydro liquid therein.

While the front liquid chamber and the rear liquid chamber are partitioned by the supporting plate 21, the supporting plate 21 is disposed with a predetermined gap from an extension part 31 having a curve so as to extend a diameter of the outer pipe 30, such that the front liquid chamber and the rear liquid chamber are opened to permit the hydro liquid to flow.

The inner pipe 20 and the outer pipe 30 are made of a steel material to have sufficient rigidity and the insulator 10 is made of a rubber material to have predetermined elasticity. One end of the outer pipe 30 is bent to have a flange shape so that the outer pipe 30 is positioned at an exact position when the outer pipe 30 is joined with a housing 30.

The insulator 10, the inner pipe 20, and the outer pipe 30 are joined to the housing 40 while being joined to each other. While the housing 40 has a shape in which both sides are opened, holes 41 are formed at protruded portions to bolt to the subframe.

The fixation bolt 51 is mounted on the bolt hole 61 of the bracket bar 60 by penetrating the endplate 50 and the inner pipe 20 in the rear of the housing 40. Therefore, the insulator 10 is elastically transformed to the front side or the rear side according to the behavior of the bracket bar 60, the inner pipe 20, and the endplate 50.

Meanwhile, in the extension part 31 of the outer pipe 30 as a section having a shape in which both sides protrude to be convex with both sides symmetric to each other, the supporting plate 22 is mounted to be positioned at a middle position of the extension part 31, that is, a place where a gap between the supporting plate 22 and the extension part 31 is the largest.

A front stopper 32 and a rear stopper 52 are mounted on the end of the outer pipe 30 (a part where a flange is formed) facing the bracket bar 60 and the endplate 50 facing the housing 40 to prevent the insulator 10 from being excessively elastically transformed.

While the insulator 10 is integrally manufactured with the inner pipe 20 as described above, the insulator 10 includes a center portion 13 joined to the surface of the supporting plate 22, a front portion 14 spaced apart from the center portion 13 to the front side to shield the front liquid chamber, and a rear portion 12 spaced apart from the center portion 13 to the rear side to shield the rear liquid chamber.

Inner surfaces (constituting the liquid chamber) of the front portion 14 and the rear portion 12 may be formed by an inclined surface having a predetermined angle so as to more efficiently pressurize the hydro liquid when elastically transformed without generating a gap from an inner contact surface with the outer pipe 30.

Accordingly, in the roll-rod of the present invention, the supporting plate 22 and the center portion 13 slide in the longitudinal direction in the extension part 31 while the insulator 10 is elastically transformed according to the behavior of the bracket bar 60 and the endplate 50. As a result, the gap between the supporting plate 22 and the extension part 31 varies.

Figure 5:
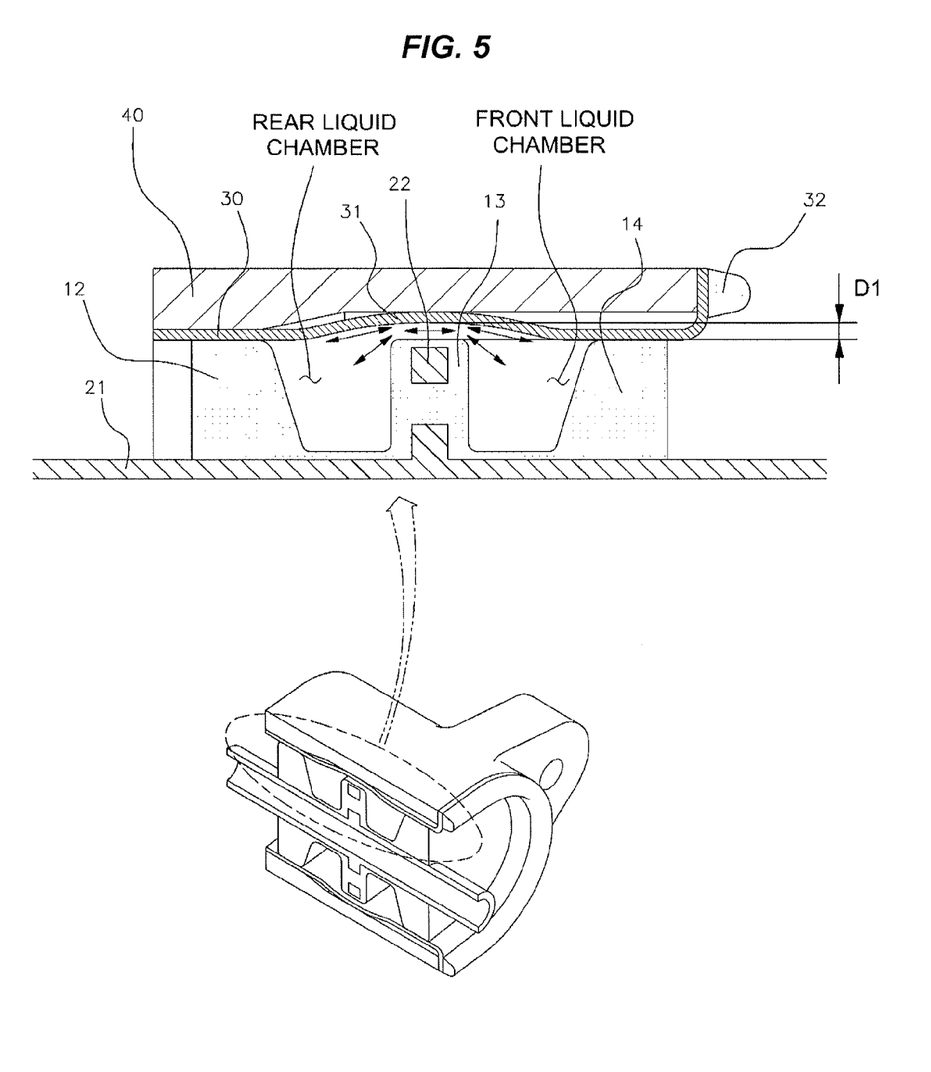
FIG. 5 is a cross-sectional view showing an internal state of the roll-rod according to the exemplary embodiment of the present invention when an engine is idle.

That is, during idling in which the vehicle does not travel or low-speed traveling in which acceleration is not generated, as shown in FIG. 5, a gap D1 between the center portion 13 joined with the supporting plate 22 and the extension part 31 is maximized, such that the hydro liquid of the front liquid chamber and the rear liquid chamber relatively freely flows, thereby deteriorating the rigidity of the roll-rod and minimizing the transfer of the vibration to the subframe.

Figure 6:
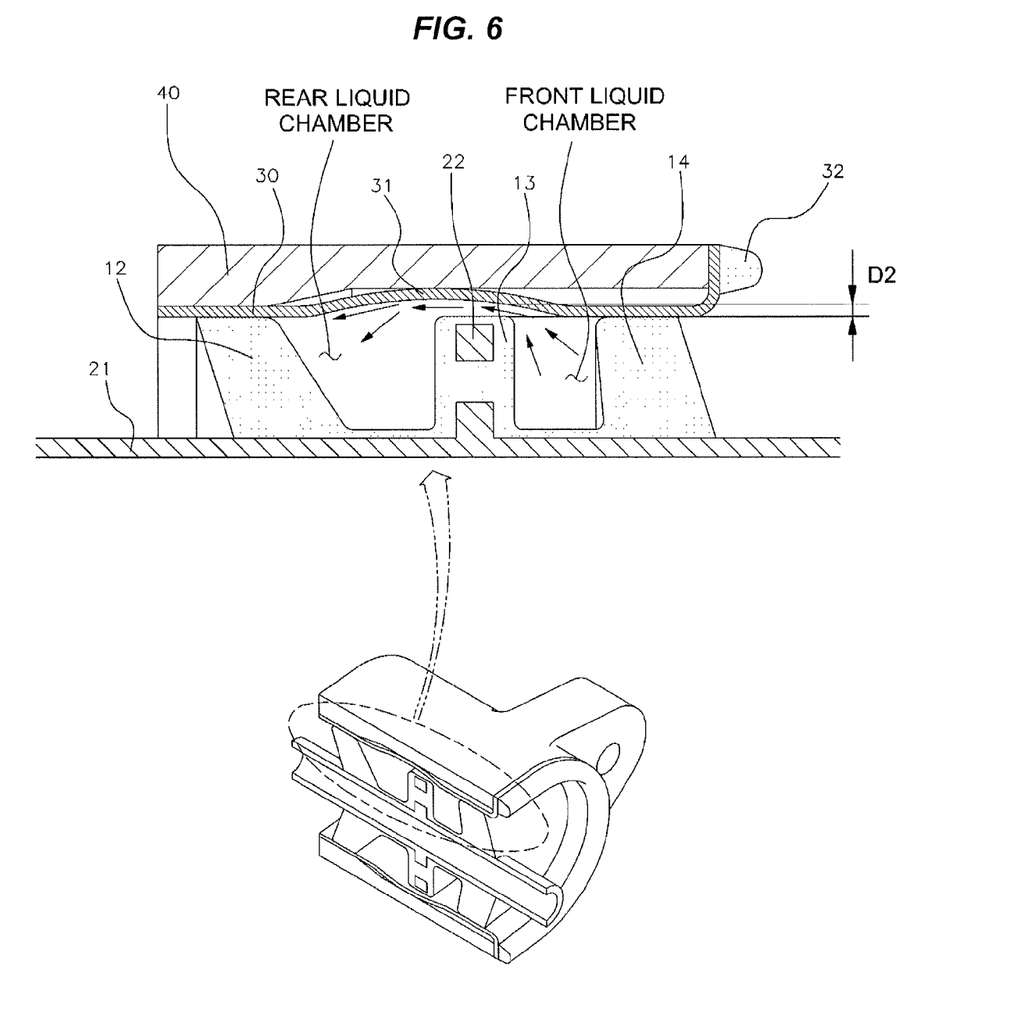
FIG. 6 is a cross-sectional view showing an internal state of the roll-rod according to the exemplary embodiment of the present invention when a quick start or a quick brake occurs.

On the contrary, when the quick start or quick brake or quick acceleration occurs in the vehicle, a gap D2 between the center portion 13 and the extension part 31 is gradually reduced (as the bracket bar and the endplate behavior to the front side or the rear side) as shown in FIG. 6. As a result, since the hydro liquid of the front liquid chamber and the rear liquid chamber is relatively difficult to flow, the rigidity of the roll-rod increases to damp the impact (like a shock absorber of a suspension).

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a roll-rod for a subframe filled with a hydro liquid therein; comprising:
    a bracket bar having a front bush mounted at one end thereof;
    an inner pipe including:
        a cylindrical pipe, one end of which is mounted on the other end of the bracket bar; and
        a supporting plate joined with the cylindrical pipe;
    an endplate joined to the other end of the cylindrical pipe, wherein the endplate is spaced with from the cylindrical pipe;
    an outer pipe enclosing the inner pipe between the bracket bar and the endplate and including an extension part;
    where the supporting plate is disposed with a gap in the extension part having a curved shape such that an inner diameter of the extension part is shaped to be larger than an outer diameter of supporting plate while the inner pipe is inserted in the extension part;
    an insulator forming a front liquid chamber and a rear liquid chamber with the supporting plate in a front and a rear of the supporting plate in a longitudinal direction of the cylindrical pipe while the insulator is mounted between the cylindrical pipe and the outer pipe in a radial direction of the cylindrical pipe so as to receive the hydro-liquid therein; and
    a housing into which the outer pipe is inserted and fixedly joined and configured to be fixed to the subframe,
    wherein the supporting plate is movable relatively to the outer pipe such that the gap between the supporting plate and the extension part varies while the insulator is elastically transformed according to movement of the bracket bar and the endplate.

2. The structure of the roll-rod for the subframe of claim 1, wherein at least a lateral surface of the front liquid chamber and the rear liquid chamber is inclined from a radial axis of the cylindrical pipe.

3. The structure of the roll-rod for the subframe of claim 1, further including: a fixation bolt that joins the endplate to the bracket bar by penetrating the inner pipe.

4. The structure of the roll-rod for the subframe of claim 1, wherein the insulator includes a center portion joined with the supporting plate, a front portion spaced apart from the center portion to shield a side of the front liquid chamber, and a rear portion spaced apart from the center portion to shield a side of the rear liquid chamber, while the insulator is integrally molded with the inner pipe.

5. The structure of the roll-rod for the subframe of claim 4, further including: a fixation bolt that joins the endplate to the bracket bar by penetrating the inner pipe.

6. The structure of the roll-rod for the subframe of claim 1, wherein a front stopper is mounted at an end of the outer pipe and faces the bracket bar to prevent an impact between the housing and the bracket bar.

7. The structure of the roll-rod for the subframe of claim 1, wherein a rear stopper is mounted on the endplate and faces the housing to prevent an impact between the housing and the endplate.

* * * * *